United States Patent [19]

Thompson

[11] 3,792,940
[45] Feb. 19, 1974

[54] EASILY CLEANED BAGEL-FORMING MACHINE

[75] Inventor: Daniel T. Thompson, Los Angeles, Calif.

[73] Assignee: Thompson Bagel Machine Manufacturing Corporation, Los Angeles, Calif.

[22] Filed: Oct. 4, 1971

[21] Appl. No.: 186,205

[52] U.S. Cl............... 425/296, 425/364 B, 425/194
[51] Int. Cl............................................. A21c 11/00
[58] Field of Search... 425/296, 301, 335, 363, 364, 425/188, 193, 194, 62

[56] References Cited
UNITED STATES PATENTS

| | | | |
|---|---|---|---|
| 3,433,182 | 3/1969 | Thompson | 425/319 X |
| 2,666,399 | 1/1954 | Pereyra | 425/194 |
| 2,746,401 | 5/1956 | Archer | 425/364 |
| 3,379,142 | 4/1968 | Reiter et al. | 425/357 X |
| 1,552,430 | 9/1925 | Gendler | 425/364 |
| 2,277,313 | 3/1942 | Fowler | 425/194 |
| 1,678,747 | 7/1928 | Scholz | 425/62 X |
| R25,536 | 3/1964 | Thompson | 425/364 |

*Primary Examiner*—Robert D. Baldwin
*Assistant Examiner*—David S. Safran

[57] ABSTRACT

An easily cleaned toroid forming apparatus has an improved frame assembly with a first frame sub-assembly receiving a second frame sub-assembly to position the dough batch feeding, forming, guiding and cutoff means of the second sub-assembly to deliver dough parts to the toroid forming means of the first sub-assembly. Each of the sub-assemblies has supporting structure to which sub-structure is movably mounted for movement between a closed operable position and an open cleaning position to provide access to the individual parts of the feeding, forming, guiding, cutoff and toroid forming means. The apparatus has a circular knife on a forming roller for dividing a wide ribbon of dough into two narrow ribbons of dough conveyed by a removable divergent path double conveyor to double bank cut-off, transfer and toroid forming means.

3 Claims, 15 Drawing Figures

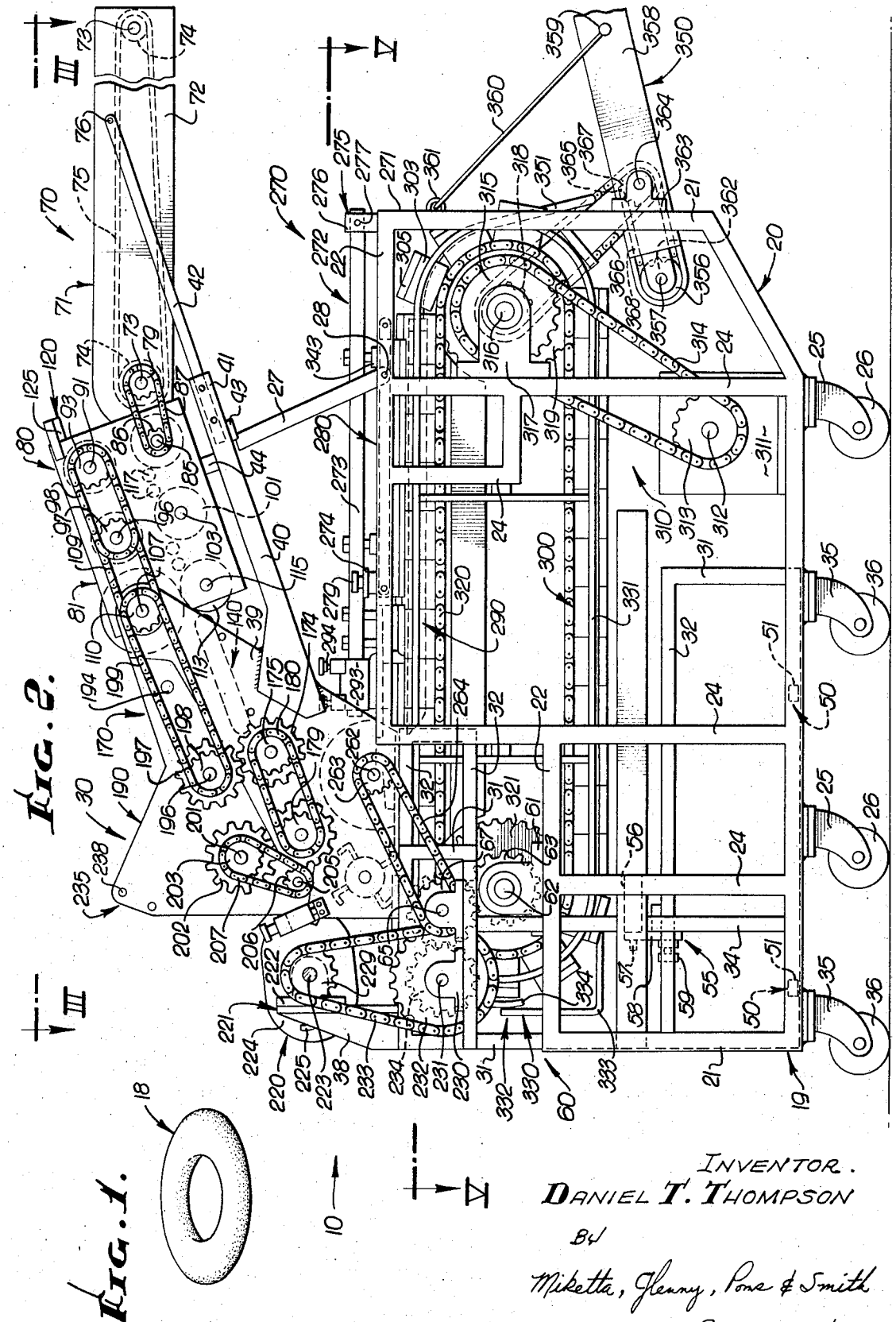

INVENTOR.
DANIEL T. THOMPSON
BY
Miketta, Glenny, Poms & Smith
ATTORNEYS.

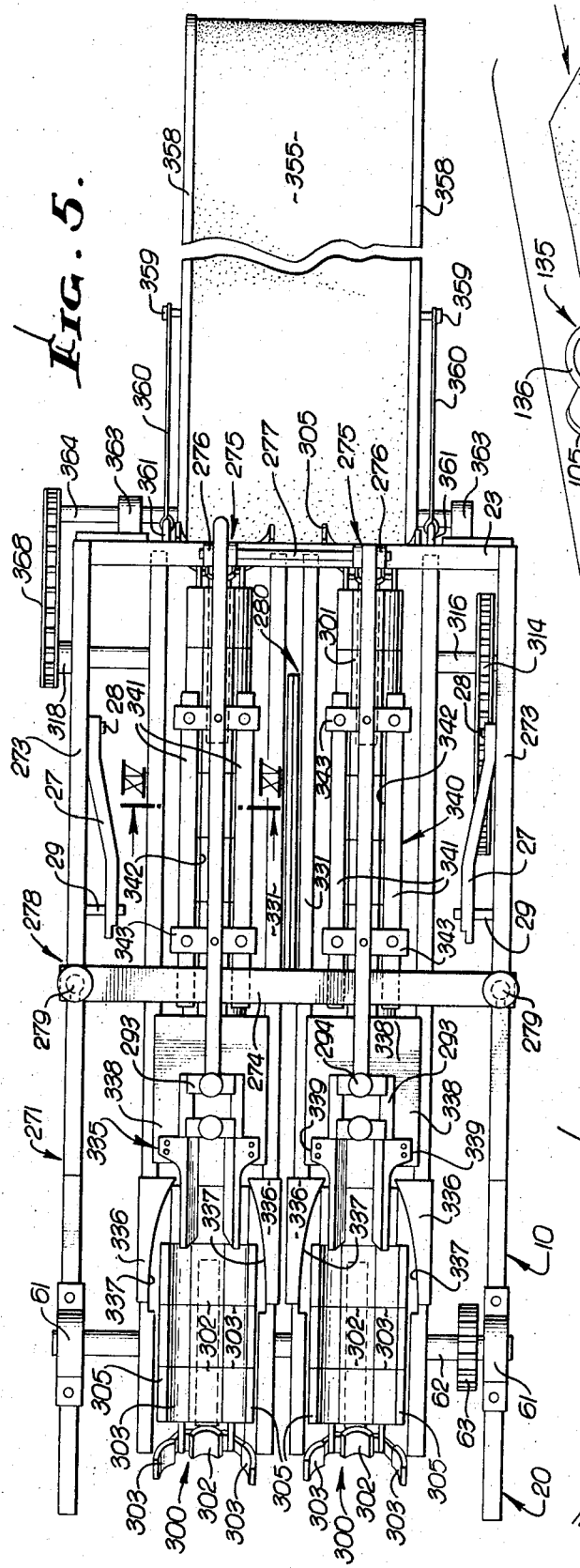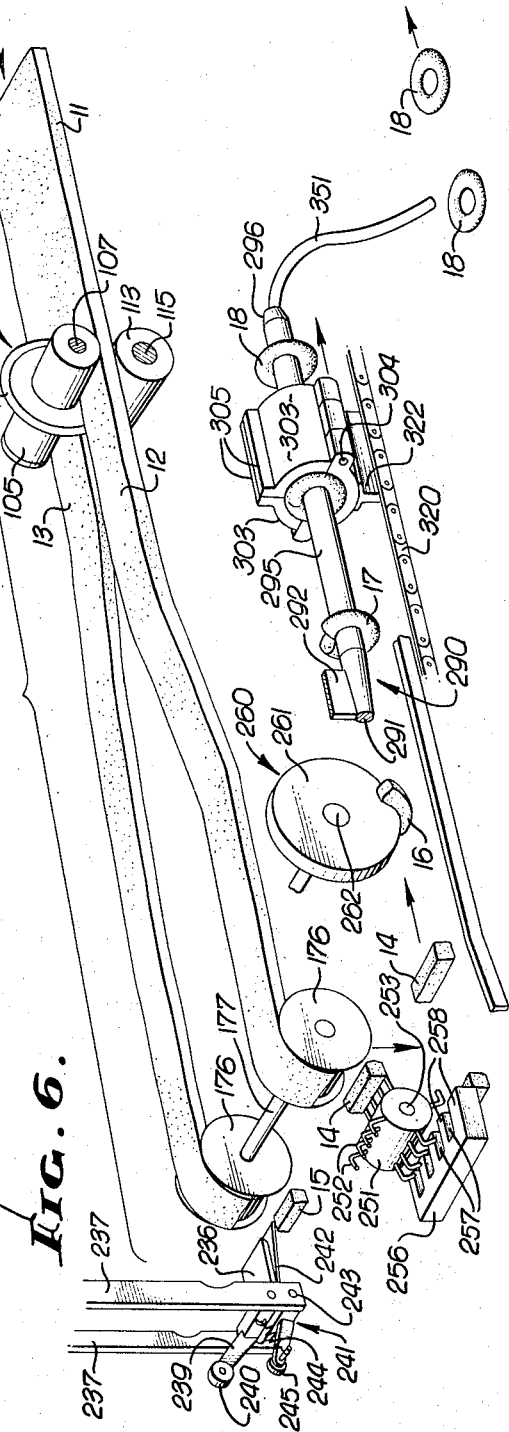

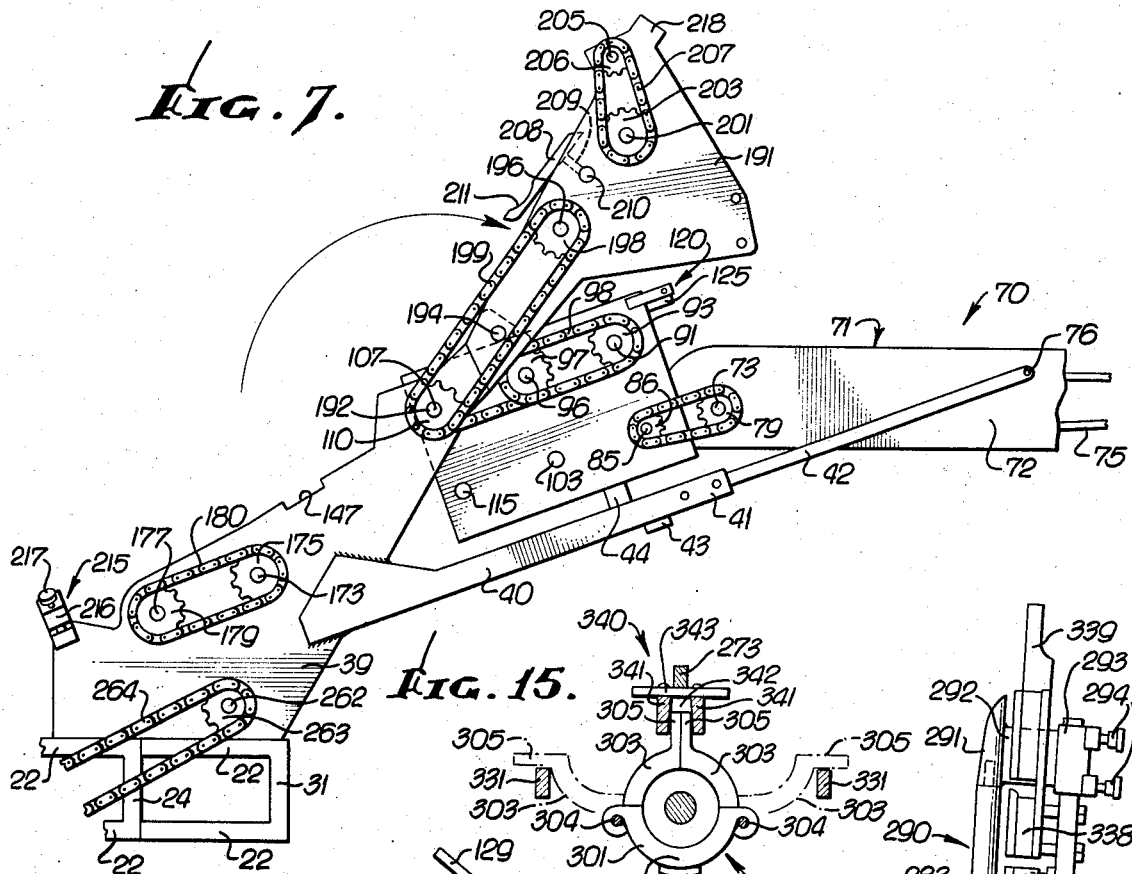
Fig. 7.
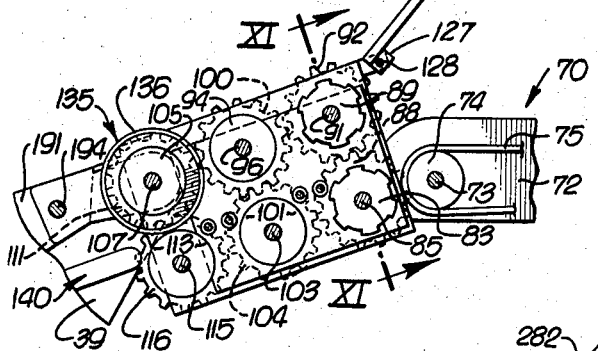
Fig. 8.
Fig. 15.
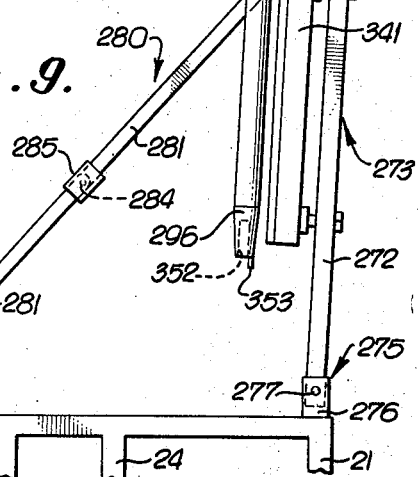
Fig. 9.
INVENTOR.
DANIEL T. THOMPSON
BY
Miketta, Glenny, Poms & Smith
ATTORNEYS.

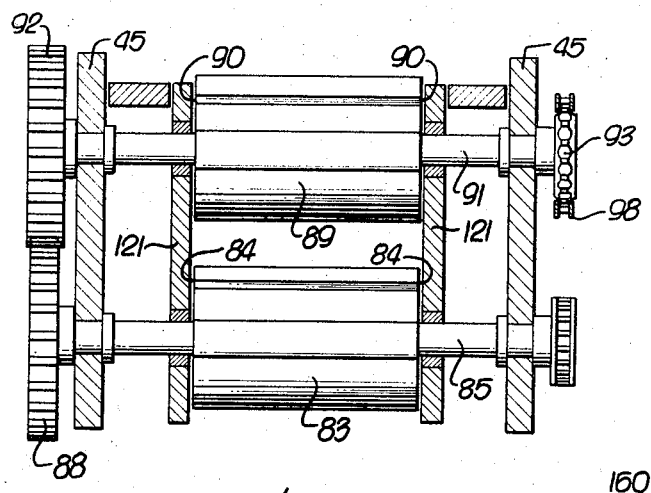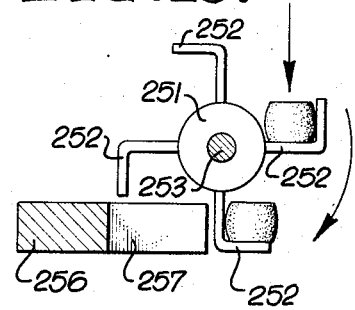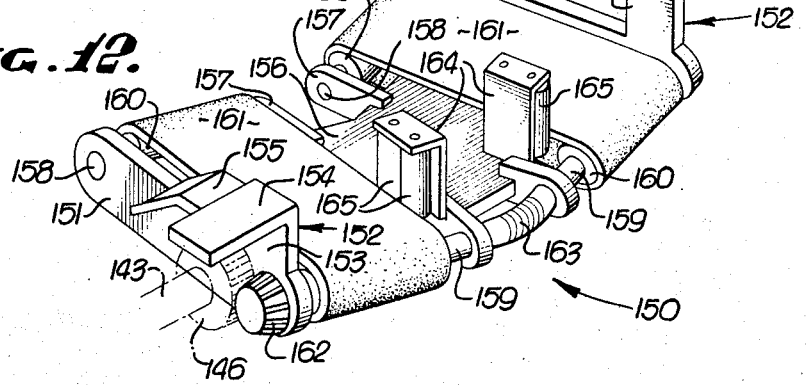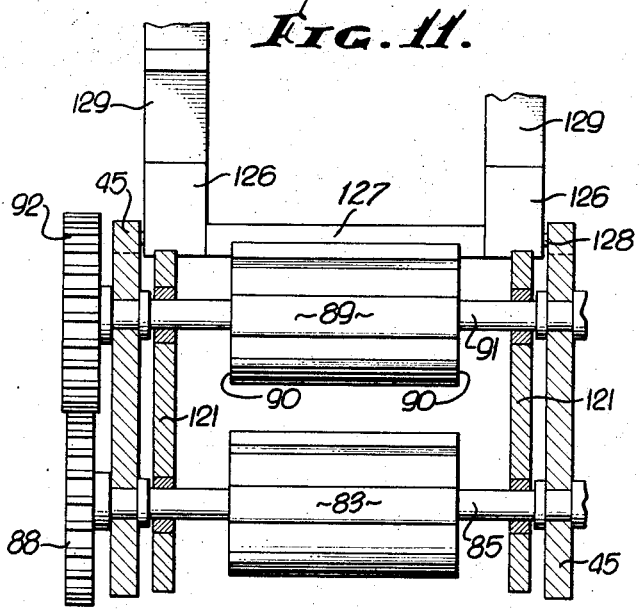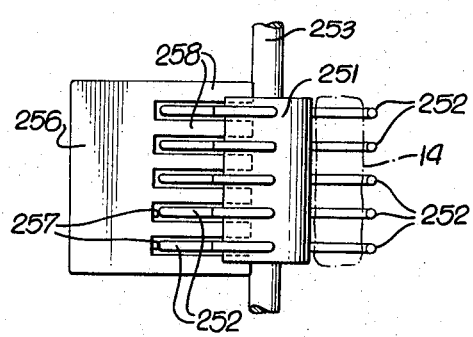

EASILY CLEANED BAGEL-FORMING MACHINE

BACKGROUND OF THE INVENTION

This invention relates in general to an apparatus for forming a plurality of toroids in rapid succession. More particularly, this invention relates to a separable frame for such apparatus which provides access to the individual parts thereof to facilitate easy cleaning.

In a bagel forming machine such as shown in U.S. Pat. No. 3,433,182, the parts thereof that contact the dough in the process of forming a bagel from a batch of dough, must be periodically cleaned to maintain the sanitary conditions required for food processing. The cleaning of such machine is done by hand methods using soap, water, brushes and sometimes steam cleaning apparatus. The hand cleaning usually involves extending brushes into the machine through a gap between the internal parts and manually moving the brushes against the parts to remove all of the dough thereon in the vicinity of the brush. The brush is then removed and inserted into another gap between the parts of the machine to repeat the process.

The hand method of cleaning is suitable for the exterior parts of the toroid forming machine which are readily accessible even though the machine is assembled, but leaves much to be desired with the many internal parts. In such machines, there are many parts or areas of parts which because of their closeness to adjacent parts cannot be reached by the brushes, or if they can be reached by the brushes, the brushes do not do a satisfactory job of cleaning. An example of the former is the mandrel located in the lower half of the machine about which the toroids are formed by the closing of sleeves as they are moved along the mandrel. An example of the latter is the sets of rollers which form the batch of dough into a wide ribbon of dough, because bits of dough drop into the space between the ends of the rollers and the supporting frame carrying the rollers, where the brush bristles cannot reach.

SUMMARY OF THE INVENTION

Therefore it is the primary object of this invention to provide an easily cleaned toroid forming apparatus.

Other and additional objects of this invention are to provide such an apparatus in which the parts thereof that contact the dough are easily cleaned, to provide such an apparatus in which the parts thereof that contact the dough are selectively separable along the path of the dough for easy access thereto, to provide such an apparatus which requires less down time for cleaning, to provide such an apparatus which is less expensive to manufacture yet produces as many completed toroids as two prior art machines, to provide such an apparatus which quickly, sanitarily and economically produces completed toroids.

Generally, the improved toroid forming machine according to this invention includes dough batch feeding, forming, guiding, and cutoff means for delivering dough parts to a toroid forming means provided therewith, with the improvement including a first frame sub-assembly means for mounting the toroid forming means; a second frame sub-assembly means for mounting the dough batch feeding, forming, guiding and cutoff means; and guide means on the sub-assembly means for guiding them between an operative joined position and a separated cleaning position. Synchronized motion transmitting means may be provided on the frame sub-assemblies to transmit synchronized motion therebetween when the assemblies are in the operative joined position. The sub-assemblies may each include supporting structure movably mounting sub-structure with some of the parts of the dough batch feeding, forming and guiding means as well as the toroid forming means being mounted to the sub-structure and the rest of the parts of each means being mounted to the supporting structure to permit the sub-structure to be separated from the supporting structure to separate the parts for cleaning. Locking means may be provided for locking the first and second frame sub-assemblies together and/or for locking the support and sub-structure together. Hold open means may be provided for the sub-structure to hold it in the open position relative the supporting structure. The dough forming means may include a dough divider means providing a plurality of ribbons of dough, and divergent conveyor means for conveying the plurality of ribbons of dough along divergent paths to the cutoff means to be delivered to a plurality of banks of toroid forming means.

These and other objects of this invention will become apparent from the following detailed description taken in conjunction with the appended drawings.

BRIEF DESCRIPTION OF THE DRAWINGS

FIG. 1 is a perspective view of a toroid formed by the apparatus with the improvements according to this invention;

FIG. 2 is a side elevational view of the apparatus with the frame sub-assemblies thereof shown in the operative joined position, and the sub-structures thereof shown in the closed operable position;

FIG. 5 is a top cross-sectional view taken along the plane V—V of FIG. 2 showing the second frame sub-assembly and the toroid forming means thereof;

FIG. 6 is a perspective schematic view of the dough as it is transformed from a batch stage to ribbons, to strips and then to toroids, with some of the parts used in the formation being shown for clarity.

FIG. 7 is a side elevational view of a portion of FIG. 2 with the guiding means sub-structure shown pivoted on its supporting structure to the open cleaning position;

FIG. 8 is a side elevational view of a portion of FIG. 2 with the locking means of the dough forming means shown in the open position;

FIG. 9 is a side elevational view of a portion of FIG. 2 with a first frame sub-assembly shown in the separated position, with the sub-structure and the mandrel means mounted thereon shown pivoted on the supporting structure to the open cleaning position where it is maintained by the hold open means;

FIG. 10 is a cross-sectional view taken along the plane X—X of FIG. 4 showing the inner parallel plates of the dough batch forming means against the roller ends in the closed operative position, and of the locking means therefor in the closed position;

FIG. 11 is a cross-sectional view taken along the plane XI—XI of FIG. 8 showing the parallel plates of the dough batch forming means spaced from the ends of the rollers in the open cleaning position, and the locking means therefor in the raised position;

FIG. 12 is a perspective view of the divergent conveyor dough transfer means shown separated from the supporting structure in the open cleaning position;

FIG. 13 is a side view of a portion of FIG. 6 showing the strip receiving end carrier means;

FIG. 14 is a top view of a portion of FIG. 6 showing the strip receiving and carrier means; and FIG. 15 is an end cross-sectional view taken along the plane XV—XV of FIG. 5 showing the details of the sleeve assembly means and the opening and closing means therefor.

DETAILED DESCRIPTION OF THE PREFERRED EMBODIMENT

Figure 4:
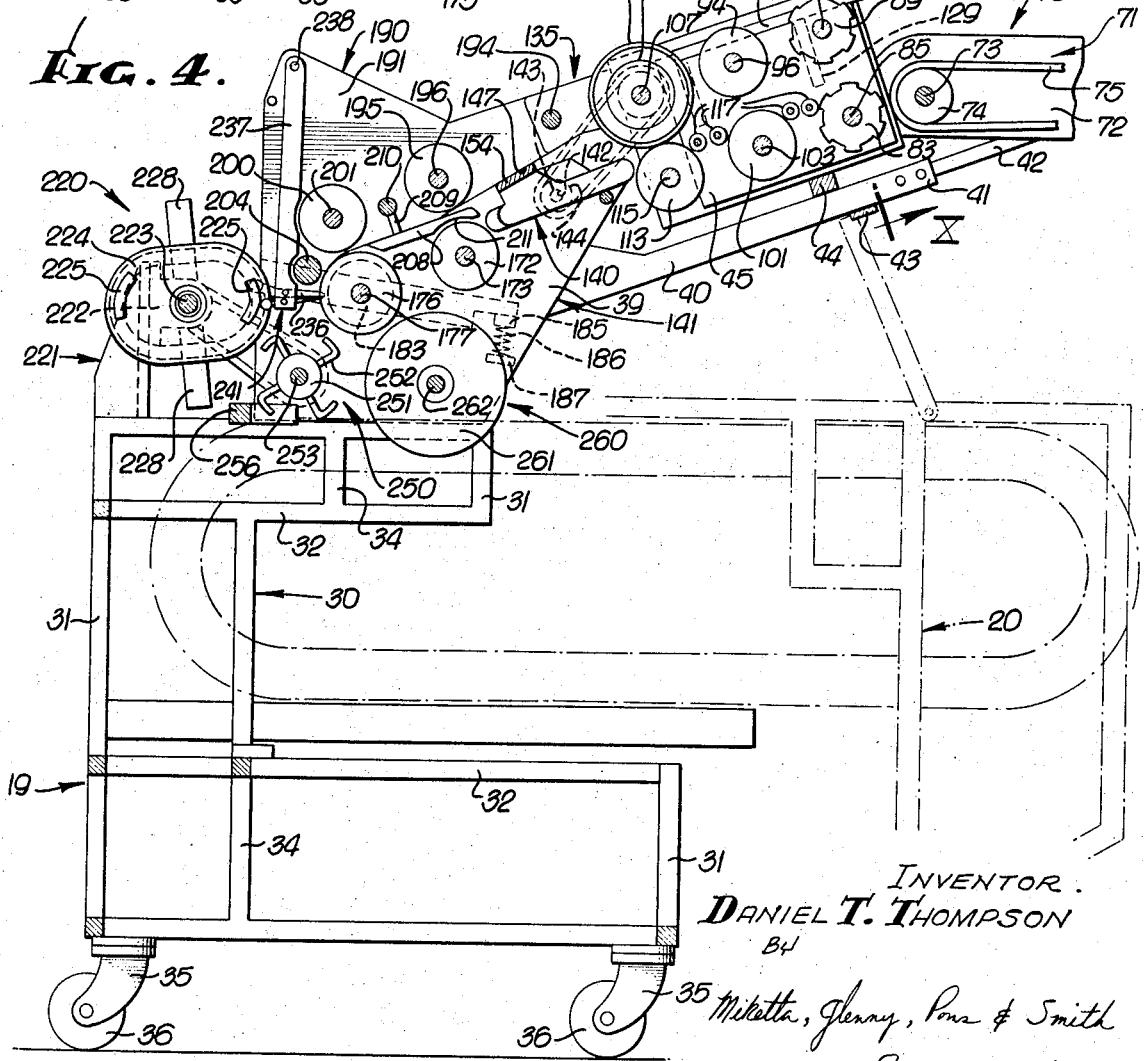
FIG. 4 is a side cross-sectional view taken along the plane IV—IV of FIG. 3 showing the second frame sub-assembly and the dough batch feeding, forming, guiding and cutoff means thereof with the major portion of the first frame sub-assembly and toroid forming means thereof shown in phantom lines.

Referring now to the drawings and particularly to FIG. 2, an assembled toroid forming apparatus is generally indicated by the numeral 10. The toroid forming apparatus 10 generally includes a composite frame 19 of a first frame sub-assembly 20 in which is received a second frame sub-assembly 30. Frame 30, as best seen in FIG. 4, mounts dough batch feeding means 70, dough batch forming means 80, divider means 135, divergent transfer means 140, dough batch guiding means 170, cutoff means 220, strip receiving and carrier means 250, strip seating means 260. The first or outer frame 20 mounts toroid forming means 270 and toroid discharge means 350, as seen in FIGS. 2 and 6, which cooperate with the previously noted means to transform a batch of dough into finished toroids. The dough batch feeding, forming, guiding and cutoff means and the toroid forming and discharge means of apparatus 10 function essentially as described in United States Letters Patent No. 3,433,182. Reference may be made to this patent for the operation of these means, per se, apart from the improvements therein disclosed herein.

Referring now to FIG. 6, the majority of the parts of the toroid forming apparatus 10 have been removed to schematically show the sequence of operations of the apparatus 10 on a dough batch. Initially, an elongated batch of dough is received and formed into a wide ribbon of dough 11 which is divided into two ribbons 12 and 13. The two ribbons 12 and 13 pass around rollers 176 where strips of dough 14 and 15 are cut therefrom. The strips 14 and 15 are initially flat but are formed first into a U-shaped strip 16 and then squeezed into a partially closed toroid 17 which is eventually closed, forming a completed toroid 18 to be carried from the apparatus 10. The shape of the completed toroid 18 produced by the apparatus 10 is best seen in FIG. 1.

The improvements according to this invention in the toroid forming apparatus include the splitting of the frame 19 into a first frame sub-assembly 20 and a second frame sub-assembly 30, which may be displaced from each other to facilitate cleaning and which may be brought together in an operatively joined position, forming a composite frame 19.

The first frame sub-assembly 20 as best seen in FIG. 2 is the lower of the frame sub-assemblies and includes corner post members 21 between which longitudinal members 22 and lateral members 23 extend with a sufficient number of vertical leg members 24 between the members 22 and the members 23 to provide a rigid structure. The members are preferably made of square cross-section steel tubing. The first frame sub-assembly has centrally located of the lowermost longitudinal members 22, caster assemblies 25 having rollers 26 for rolling along the floor. The first frame sub-assembly also includes a pivoted support arm 27 which pivots on pin 28 and rests against stop 29.

The second frame sub-assembly 30 also includes corner post members 31 between which longitudinal members 32 and lateral members 33 extend with a sufficient number of vertical leg members 34 between the members to provide a rigid structure. These members are also preferably made of square cross-section steel tubing. The second frame sub-assembly has caster assemblies 35 on the lowermost longitudinal members 32 underneath the corner post members 31. The caster assemblies 35 have rollers 36 for rolling along the floor.

The second frame sub-assembly also includes a pair of corner plates 37 over the left corner post members 31 with flanged vertical members 38 extending vertically upwardly therefrom for a purpose which will appear later. Immediately to the right of the plates 37 are parallel longitudinal first side plates 39 extending upwardly from the uppermost longitudinal members 32. The first side plates 39, each have rightwardly extending arm 40 welded thereto. The arms 40 are each provided with a slotted right end 41 which receives the bolts through an extension 42. The arms 40 have a lower cross bar 43 thereacross as well as an upper cross bar 44 therebetween. A second pair of parallel longitudinal side plates 45 are welded to the upper cross bar with the left ends of the second side plates 45 located within and spaced from the side plates 39.

The left end of the first frame sub-assembly 20 is opened and the lateral members 33 of the second frame sub-assembly 30 are of a length so that the second frame sub-assembly 30 may be received within the opening in the left end of the first frame sub-assembly 20. To facilitate the reception of the second frame sub-assembly 30 by the first frame sub-assembly 20, guide means 50 are provided which, in the present embodiment, comprise rollers 51 mounted on the lowermost longitudinal members 22 of the first frame sub-assembly 20 and extending between the longitudinal members 22 and 32. The rollers 51 and the rollers 26 and 36 of the caster assemblies 25 and 35 facilitate the easy movement of the first and second frame sub-assemblies 20 and 30 between a separated cleaning position shown in FIGS. 4 and 9, and an operative joined position, shown in FIG. 2. In the operative joined position, the support arms 27 of the first frame sub-assembly 20 pivot upwardly from the stops 29 to engage the lower cross bar 43 with the upper free end thereof to help support the right end of the second frame sub-assembly 30.

The composite frame 19 is also provided with locking means 55 for preventing the first and second frame sub-assemblies 20 and 30 from inadvertently separating during operation of the toroid forming apparatus 10. In the preferred embodiment, the locking means includes a locking arms 56 extending to the left of central vertical leg members 24 of the first frame sub-assembly 20. On the left end of each of the locking arms 56 is a bolt 57 which rotatably mounts a hasp 58 containing a bolt 59 which upon proper positioning of hasp 58, engages a central vertical leg member 34 of the second frame sub-assembly 30 to prevent the second frame sub-assembly from separating from the first frame sub-assembly 20. The bolt 59 may be loosened and the hasp 58 rotated on the bolt 57 from over the vertical leg member 54 to facilitate the unlocking of the frame sub-assemblies 20 and 30.

The composite frame 19 has synchronized motion transmitting means 60 for synchronizing the motion of the various means on the first frame sub-assembly 20 with the motion of the various means on the second frame sub-assembly 30. In the preferred embodiment, the synchronized motion transmitting means 60 includes transversely aligned, spaced bearing blocks 61 mounted on adjacent intermediate longitudinal members 22 on the near side of sub-assembly 20. A shaft 62 extends between the blocks 61 and mounts a gear 63 thereon between the blocks 61. A mating gear 64 is mounted on shaft 65 extending between transversely aligned spaced bearing blocks 66 mounted on adjacent intermediate longitudinal members 32 on the near side of the second frame sub-assembly 30. When the frame sub-assemblies are in the operative joined position, the gear 63 meshes with the gear 64 to provide a synchronizing connection between the two frame sub-assemblies 20 and 30. Additionally, the shaft 65 includes a sprocket 67 for a purpose which will appear later.

The composite frame 19 mounts all of the means of the apparatus 10 with the dough batch feeding means 70, the dough batch forming means 80, the divider means 135, the divergent transfer means 140, the dough batch guiding means 170, the dough batch cut-off means 220, the strip receiving and carrier means 250, and the strip seating means 260 being mounted to the second frame sub-assembly 30 while the toroid forming means 270 and toroid discharge means 350 are mounted on the first frame sub-assembly 20. When the first and second frame sub-assemblies 20 and 30 are operatively joined, the toroid forming means 270 is positioned to receive the strips of dough 14 and 15 from the carrier means 250 so that the strips of dough 14 and 15 may be seated therein by the strip seating means 260. The meshing of gears 63 and 64 insures synchronization of the means of the two frame sub-assemblies 20 and 30 in the operative joined position.

Each of the two frame sub-assemblies 20 and 30 which individually mount the various means of the apparatus 10, are provided with supporting structure to which sub-structures are movably mounted by movable mounting means in accordance with this invention. Each of the sub-structures either mounts some of the parts of respective means with the rest of the parts of that means being mounted to the supporting structure or is mounted closely to the parts of respective means. The sub-structure is then selectively movable relative its supporting structure between a closed operable position wherein the parts of the means are operably associated and an open cleaning position wherein either the parts mounted to the sub-structures are separated from the parts mounted to the supporting structure or the sub-structure is separated from the respective parts, in either case to provide easy access to the parts of the apparatus 10 for cleaning.

Figure 3:
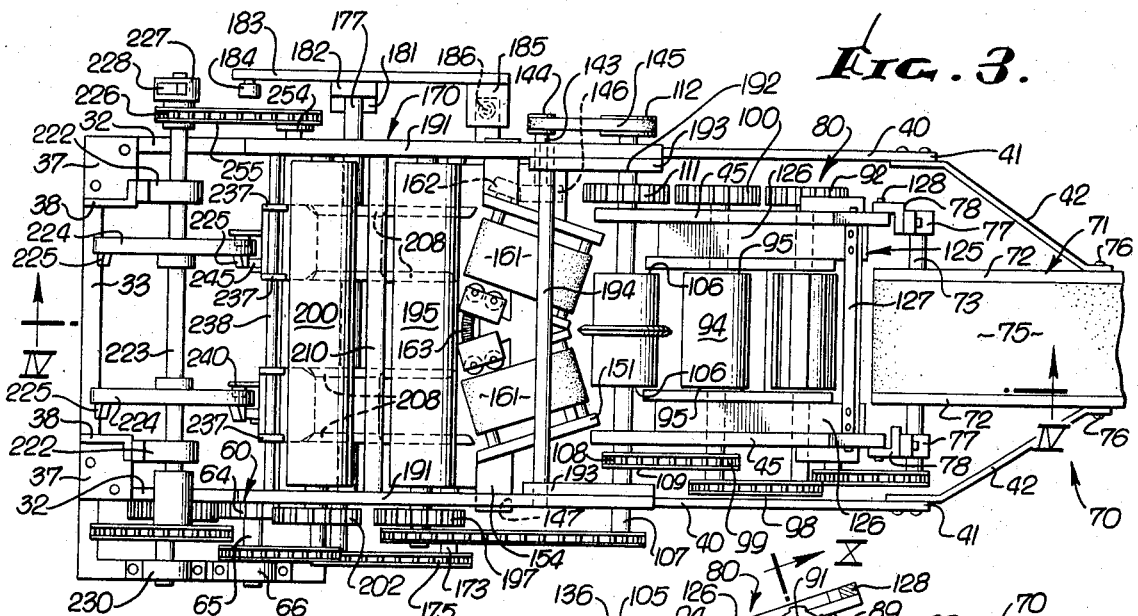
FIG. 3 is a top elevational view taken along the plane III—III of FIG. 2.

Referring now to FIGS. 2, 3 and 4, the apparatus 10 is provided with dough batch feed means 70 for receiving a somewhat elongated batch of dough and delivering it to the dough forming means 80. In the exemplary embodiment, the dough batch feed means includes a conveyor assembly 71 with parallel sidewalls 72 between which shafts 73 are rotatably mounted adjacent the ends thereof to mount sheaves 74. If so desired, the sidewalls 72 may have an inner liner of plastic which permits the dough carried thereby to slide easily along the walls 72. A conveyor belt 75 passes around sheaves 74 to carry the batch of dough thereon. The sidewalls 72 are centrally mounted to the second frame sub-assembly 30 by the extensions 42 having pins 76 extending into the sidewalls 72 thereof. The left ends of the sidewalls 72 are mounted to the second frame sub-assembly 30 by the extension of the shaft 73 beyond the sidewalls 72 and into aligned shaft bearing blocks 77 mounted on angles 78 secured to the left ends of the second side plates 45. As best seen in FIG. 2, the near end of shaft 73 has a sprocket 79 for a purpose which will appear later. The batch feed means 70 may be pivoted on the shaft 73 to accept dough at various heights and may be rotated to a vertical position for storage.

The dough batch forming means 80 for receiving the batch of dough from the batch feeding means 70 and forming the batch of dough into the wide ribbon of dough 11 is again best seen in FIGS. 2, 3, 4, 10 and 11. In the preferred embodiment, the supporting structure 81 of the dough forming means 80 includes the second side plates 45 of the second frame sub-assembly 30. The plates 45 have a series of aligned apertures therein for receiving shafts therein.

As best seen in FIG. 4, 10 and 11 a first lower roller 83 has an axially grooved surface for pulling the batch of dough from the conveyor belt 75. The roller 83 has two ends 84 which are spaced from the second side plates 45 with a shaft 85 extending through the roller 83 and outwardly from the ends 84 thereof through the lower right aligned apertures in the second side plates 45. As best seen in FIG. 2, the near end of the shaft 85 has a sprocket 86 with a chain 87 extending therefrom to sprocket 79. As best seen in FIG. 8, the far end of shaft 85 has a gear 88 for a purpose which will appear later.

A first upper roller 89 is mounted over the first lower roller 83 and has a similarly grooved surface. As seen in FIGS. 10 and 11 the first upper roller has two ends 90 spaced from the second side plates 45 with a shaft 91 extending through the first upper roller 89 and from the ends 90 through the second side plates 45. The far end of the shaft 91 has a gear 92 which meshes with the gear 88 to interconnect the first upper and first lower rollers 89 and 83. The near end of shaft 91 has a sprocket 93 for a purpose which will appear later.

The dough forming means 80 is provided with a second upper roller 94 again having ends 95 spaced from the second side plates 45 with a shaft 96 extending therethrough and through the second side plates 45. The near end of shaft 96 has a sprocket 97 from which a chain 98 extends to sprocket 93 to interconnect the first upper roller 89 with the second upper roller 94. Inwardly of the sprocket 97 on the near end of the shaft 96 is a second sprocket 99 for a purpose which will appear later. On the far end of the shaft 96 is a gear 100 also for a purpose which will appear later.

Below the second upper roller 94 is a second lower roller 101 again with two ends 102 spaced from the second side plates 45 with a shaft 103 extending through the roller 101 and through the second side plates 45. The far end of the shaft 103 has a gear 104 which meshes with the gear 100 of the second upper roller to interconnect the upper and lower rollers 94 and 101 together.

The dough forming means 80 also includes a third upper roller 105 between and with two ends spaced from the second side plates 45. A shaft 107 extends through the third upper roller 105 and from the ends 106 through the second side plates 45 and also through the first side plates 39. A sprocket 108 is located on the shaft 107 between the near plate of the second side plates 45 and the near plate of the first side plates 39 with a chain 109 extending to sprocket 99 to interconnect the second and third upper rollers 94 and 105. The near end of shaft 107 also has a sprocket 110 outboard of the naer plate of the first side plates 39 for a purpose which will appear later. A gear 111 is provided on the far end of shaft 107 between the far plate of the second side plates 45 and the far plate of first side plates 39 for a purpose which will appear later. A pulley 112 is provided on the far end of the shaft 107 also for a purpose which will appear later.

A third lower roller 113 is provided below the third upper roller 105. The third lower roller 113 has two ends spaced from the second side plates 45 with a shaft 115 through the lower roller 113 and extending from the ends through the second side plates 45. A gear 116 is located on the far end of shaft 115 to mesh with gear 111 to interconnect the third upper roller 105 and third lower roller 113. Thus, the first upper and lower, second upper and lower, third upper and lower rollers are all interconnected.

Additionally, small intermediate rollers 117 are provided in pairs between the first and second lower rollers 83 and 101 and between the second and third lower rollers 101 and 113, to convey the wide ribbon of dough 11 therebetween.

The dough forming means 80 is provided with sub-structure means 120 to selectively provide access to the parts of the dough forming means 80 for cleaning thereof. In the preferred embodiment, as best seen in FIGS. 10 and 11, the sub-structure means includes inner parallel plates 121 having aligned apertures through which the shafts 85, 91, 96, 103, 107 and 115 pass to slidably mount the inner parallel plates 121 between the second side plates 45 and the roller ends 84, 90, 95, 102, 106 and 114. As seen by comparing the FIGS. 10 and 11, the inner parallel plates 121 are slidably movable between an inner closed operating position adjacent the ends of the rollers, and an open cleaning position spaced from the ends of the rollers and adjacent the second side plates 45 to provide easy access to the ends of the rollers to clean out bits of dough that may stick thereto during operation of the apparatus 10.

The sub-structure means 120 also includes locking means 125 for holding the inner parallel plates 121 in the closed operating position. In the preferred embodiment, and as seen in FIGS. 3, 8 and 11, the locking means 125 includes a spaced pair of longitudinal arms 126 interconnected by a transverse tie member 127 and pivoted at 128 to the right upper corners of the second side plates 45. As best seen in FIG. 8, each of the longitudinal arms 126 has two depending fingers 129 which in a holding position extend between the adjacent sides of the inner parallel plates 121 and the second side plates 45 to hold the inner parallel plates 121 against the ends of the rollers. The longitudinal arms 126 are pivoted at 128 to raise the fingers 129 from between the adjacent sides of the inner parallel plates 121 and the second side plates 45 to an open raised or unlocked position. In the unlocked position of the arms 126, the inner parallel plates 121 may be slid on the shafts to an open cleaning position, providing access to the ends of the rollers for cleaning.

When the inner parallel plates 126 are in the closed operative position and held there by the fingers 129, the elongated batch of dough on the left end of the conveyor belt 75 is pulled therefrom by the grooved surface of the first upper and lower rollers 89 and 83, rotating oppositely to feed the elongated batch of dough along the intermediate small rollers 117 between the second upper and lower rollers 94 and 101 where the dough is further formed into a wide ribbon of dough 11. The wide ribbon of dough 11 from the second upper and lower rollers 94 and 101 passes along the intermediate small rollers 117 to the third upper and lower rollers 105 and 113.

The toroid forming apparatus 10 is also provided with divider means 135 for dividing the wide ribbon of dough 11 into two narrow ribbons 12 and 13 of dough. In the preferred embodiment, the divider means 135 is a circular knife 136 centrally located on the third upper roller 105 and extending to the surface of the third lower roller 113 to divide the wide ribbon of dough 11 into two narrow ribbons of dough 12 and 13 as it passes between the third upper roller 105 and the third lower roller 113.

Divergent dough transfer means 140 is provided for the toroid forming apparatus 10 for receiving the narrow ribbons of dough 12 and 13 and separating them from each other. The supporting structure means 141 for the divergent transfer means 140 in the preferred embodiment are the first side plates 39. The far side plate 39 has an aperture 142 therethrough through which a shaft 143 extends. On the far end of shaft 143 is a pulley 144 with a V-belt 145 therearound extending to pulley 112 to drivingly connect the shaft 143 with the shaft 107 of the third upper roller 105 for a purpose which will appear later. On the near end of shaft 143 between the first side plates 39 is a bevel tooth gear 146. The supporting structure means 141 also includes a notch 147 in the upper surface and centrally located in each of the first side plates 39 for a purpose which will appear later.

The divergent dough transfer means 140 also has sub-structure means 150 which is best illustrated in FIG. 12. (FIG. 12 has been reversed from its position in FIGS. 2 and 3 for clarity of illustration. However, for the sake of uniformity the use of the terms near and far will be applied to the sub-structure 150 as it is mounted in the apparatus 10 and these terms will be reversed when applied to FIG. 12.) The sub-structure means 150 includes diverging side edge members 151, each having vertical inverted L-flange 152 with a vertical leg 153 extending upwardly therefrom and with the upper leg 154 thereof outturned for being received in the notch 147. The far flange 152 is provided with a gear cover 155 for a purpose which will appear later. A cross member 156 interconnects the side edge members 151 and mounts central diverging edge members 157, each parallel to an associated side edge member 151.

Fore and aft shafts 158 and 159 extend between associated side and central edge members 151 and 157 with sheaves 160 therearound for mounting diverging conveyor belts 161. On the far end of the far aft shaft 159

(shown in FIG. 12 in the lower left corner because FIG. 12 is reversed) is a bevel tooth gear 162 which meshes with bevel tooth gear 146 to drive the far conveyor belt 161 while a flexible coupling 163 between the near and far aft shafts 159 drivingly connects the near aft shaft 159 and the near conveyor belt 161 to the gear 162. The gear cover 155 covers gears 162 and 146 to deflect any dough, that might drop toward these gears, away therefrom to keep the gears freely meshing. The cross member 156 has two inverted L-shaped roller mounts 164 extending upwardly therefrom adjacent the central edge members 157 with the outturned legs thereof mounting vertical rollers 165 which face outwardly.

When the sub-structure means 150 is separated from the supporting structure 141, the conveyor belts 161, rollers 164 and related parts thereto can be easily cleaned. The sub-structure means 150 is received between the first side plates 39 with the outturned upper legs 154 of the inverted L-flanges 152 received in the notches 147 to locate the diverging conveyor belts 161 with the adjacently spaced ends thereof adjacent the third lower roller 113 for receiving the ribbons of dough 12 and 13 therefrom. The ribbons of dough 13 pass from the third lower roller 13 onto the adjacently spaced ends of the conveyor belts 161 until the ribbons 12 and 13 engage the vertical rollers 164 and are turned thereby longitudinally of the conveyor belts 161 to be divergently carried thereby to the dough batch guiding means 170.

Hereafter in the description of the apparatus 10, the means discussed will have provision made for receiving two separated units of dough either by providing extra wide parts to accommodate the dual units or by providing two identical banks of parts to receive and operate upon the separated dual units. Mnay times the dual nature of the parts will not be discussed for simplicity of description but such a dual nature should be remembered where appropriate even though not repeatedly referred to.

The dough batch guiding means 170 for guiding the ribbons of dough 13 to the cutoff means 220 is best seen in FIGS. 2, 3, and 4. The dough batch guiding means 170 includes supporting structure which, in the preferred embodiment, are the first side plates 39 with a plurality of shaft receiving apertures therethrough. A first lower guide roller 172 extends between the side plates 39 with a shaft 173 therethrough. The near end of shaft 173 has a gear 174 located outboard yet adjacent the near first side plate 39 and a sprocket 175 on the near end of the shaft 173 outboard of the gear 174.

A second lower guide roller 176 is provided between the first side plates 39 with a shaft 177 therethrough. In the preferred embodiment, the second lower guide roller 176 is actually two aligned rollers wih sides for limiting spread of the ribbons of dough 12 and 13 for a purpose which will appear later. A gear 178 is located on the near end of shaft 177 outboard yet adjacent the near first side plate 39 and a sprocket 179 is located on the near end of shaft 177 outboard of the gear 178. The sprocket 179 has a chain 180 therearound which extends to sprocket 175 to interconnect the first and second lower rollers 172 and 176.

On the far end of the shaft 177 is a one way ratchet 181 with a collar 182 covering the far end thereof. The collar 182 has an arm 183 with a roller 184 on the left end and a tab 185 on the right end. A spring 186 extends from the tab 185 on the arm 183 to a seat 187 extending from the far first side plate 39 to limit the rotational movement of the arm 183 and therefore the collar 182 to an arc relative shaft 177. The ratchet 181 turns the limited arcuate motion of the collar 181 into intermittent rotation of the shaft 177 for a purpose which will appear later. The intermittent rotation of shaft 177 is transmitted via the various chains and gears already described to the rest of the dough batch guiding means 170, the divergent dough transfer means 140, the divider means 135, the dough batch forming means 80 and the dough batch feeding means 70.

The dough batch guide means 170 has a substructure 190 including upper parallel plates 191 located above and spaced similarly to first side plates 39. The upper parallel plates 191 are pivoted at 192 to shaft 107 and have inner reinforcing plates 193 extending to the left from shaft 107 to terminate after mounting the first of a pair of cross braces 194 between the upper parallel plates 191. The upper parallel plates 191 have a series of aligned apertures therethrough.

A first upper guide roller 195 extends between the upper parallel plates 191 with a shaft 196 therethrough and through the upper right aligned apertures of the parallel plates 191. The near end of the shaft 196, outboard yet adjacent the near parallel plates 191, has a gear 197 thereon which meshes with gear 174 to interconnect the first upper and lower guide rollers 172 and 195. The near end of shaft 196 outboard of the gear 197 has a sprocket 198 with a chain 199 therearound to sprocket 110 for interconnecting the third upper roller 105 with the first upper guide roller 195.

A second upper guide roller 200 is provided between the upper parallel plates 191 on the left of the first upper guide roller 195. The second upper guide roller 200 has a shaft 201 therethrough and through aligned apertures in the parallel plates 191. The near end of the shaft 201 has a gear 202 thereon outboard yet adjacent the near upper plate 191 which meshes with the gear 178 to interconnect the second upper guide roller 200 with the second lower guide roller 176. The near end of shaft 201 outboard of the gear 202 has a sprocket 203 for a purpose which will appear later.

A downturning guide roller 204 is provided between the upper parallel plates 191 generally midway between the second upper guide roller 200 and second lower guide rollers 176 and slightly to the left thereof for turning the ribbons of dough 12 and 13 from therebetween, downwardly toward the cutoff means 220. The downturning guide roller 204 has a shaft 205 therethrough and through the upper parallel plates 191 with a sprocket 206 on the near end thereof with a chain 207 around the sprocket 206 and around sprocket 203 to interconnect the downturning guide roller 204 with the second upper roller 200.

As best seen in FIGS. 3 and 4, the dough batch guiding means also includes two pairs of internal guide plates 208 forming two ribbon receiving channels. Each of the internal guide plates 208 has a centrally located upstanding post 209 attached in suitable spaced relationship along and to a cross shaft 210 centrally located between the first and second upper guide rollers 195 and 200. The internal guides 208 have circular notches 211 cut in the lower surface thereof adjacent either end.

The upper parallel plates 191 of the sub-structure 190 as best seen in FIG. 7 pivot at 192 to an open cleaning position, separating the lower rollers 172 and 176 from the upper rollers 195, 200 and the downturning roller 204 for cleaning. The internal guides 208 also are separated by the pivoting of the upper parallel plates 191 from the lower rollers 172 and 176 and can be pivoted on the cross shaft 210 slightly, to clean between the guides 208 and the upper rollers 195 and 200.

The pivoting of the sub-structure 190 to the open cleaning position also permits the removal of the sub-structure means 150 of the divergent transfer means 140.

When the sub-structure means 150 including the conveyor belts 161 of the divergent transfer means 140 is positioned between the first side plates 39 with the outturned upper legs 154 of flanges 152 in the notches 147, the sub-structure 189, that is the upper parallel plates 191, may pivot from the open cleaning position shown in FIG. 7 to the closed position shown in FIGS. 2 and 4. In the closed position, the bottom edge of the upper parallel plates 191 engage the outturned upper legs 154 of the flanges 152 in the notches 147 to hold the sub-structure means 150 and therefore the divergent transfer means 140 in position. Additionally, the pivoting of the sub-structure 190 to the closed operable position meshes the gears 174 and 178 with the gears 197 and 202 and locates the upper guide rollers 195 and 200 in operable relationship over the associated lower guide rollers 172 and 176.

A locking means 215 is provided for selectively locking the sub-structure 190 in the closed operating position. In the preferred embodiment, the locking means includes hasps 216 pivotally mounted adjacent the left ends of the first side plates 39. Each hasp 216 has a bolt 217 which when the hasp 216 is pivoted to the upright position extends over an associated rearwardly extending shoulder 218 from the lower left edge of the upper parallel plates 191. The bolts 217 engage the shoulders 218 to hold the upper parallel plates 191 in the closed operable position.

In the closed operable position, the dough batch guiding means 170 receives the narrow ribbons of dough 12 and 13 from the divergent transfer means 140 between the first upper and lower guide rollers 195 and 172. The narrow ribbons of dough 12 and 13 are moved thereby between the pairs of internal guides 208 to the second upper and lower guide rollers 200 and 176. From between the second upper and lower guide rollers 200 and 176, the narrow ribbons of dough 12 and 13 pass against the downturning roller 204 to be turned downwardly between the downturning roller 204 and the second lower guide roller 176 to pass towards to cutoff means 220.

The apparatus 10 is provided with two strip cutoff means 220 for cutting successive transverse strips 14 and 15 from the ends of ribbons 12 and 13. Referring now to FIGS. 2 and 4 each cutoff means 220 in the exemplary embodiment has supporting structure means 221 including the corner plates 37 and the flanged vertical members 38 of the second frame sub-assembly 30. Spaced bearing blocks 222 are mounted near the upper end on the right hand side of the flanged vertical members 38. A shaft 223 extends between the blocks 222. Between the flanged vertical members 38 on the shaft 223 are mounted a pair of suitably spaced push pull cams 224 having opposed tabs 225 protruding therefrom for a purpose which will appear later. On the far end of shaft 223 is a sprocket 226 for a purpose which will appear later, and outboard of the sprocket 226 on the far end of shaft 223 is a collar 227. The collar 227 has oppositely extending arms 228 which, when the collar 227 is rotated, strike the roller 183 on the arm 182 to pivot the arm 182 in response to rotation of shaft 223 and to provide synchronized intermittent motion to the dough batch guiding means 170 divergent dough transfer means 140, the dough forming means 80 and the batch feeding means 70. On the near end of shaft 223 is a sprocket 229 for a purpose which will appear later.

A pair of aligned spaced bearing blocks 230 are mounted on the adjacent near upper longitudinal members 32 adjacent the upper left corner of the second frame sub-assembly 30. A shaft 231 extends between the blocks 230. A sprocket 232 is mounted about the shaft 231 adjacent the near block 230 and has a chain 233 therearound to sprocket 229. A gear 234 is mounted on the shaft 231 adjacent the sprocket 232 and meshes with gear 64.

The sub-structure means 235 of the cutoff means 220 includes the upper parallel side plates 191. Cutoff blades 236 have vertical arms 237 extending upwardly therefrom to pivot at 238 to the upper parallel side plates 191. The cutoff blades 236, each has an extension 239 extending rearwardly therefrom to mount roller 240 which rides in a respective push pull cam 224 to move the blades 236 both against and away from the second lower guide rollers 176 at intervals to cut strips of dough 13 and 14. The blades 236 fit between the sidewalls of the second lower guide rollers to reach the surface thereof and the sidewalls prevent the ribbons 12 and 13 from spreading while being cut.

The cutoff means 220 also includes separator means 241. In the preferred embodiment, the separator means includes separator blades 242 below the cutoff blade 236 and pivoted by shaft 243 to the lower end of the vertical arms 237. The separator blades 242 have springs 244 which normally bias the separator blades 242 against the cutoff blades 236. The rear ends of the blades 242, each has a roller 245 which is engaged by the tabs 225 of the cams 224 to pivot the separator blades 242 on the shaft 243 downwardly away from the cutoff blades 236 at the appropriate time to separate the strips of dough 14 and 15 from the ribbons of dough 12 and 13 after the strips 14 and 15 have been cut therefrom by the cutoff blade 236. The separated strips 14 and 15 from the separator means 241 fall onto the strip receiving and carrier means 250.

The apparatus 10 is provided with two strip receiving and carrier means 250 for transferring the cut-off strips 14 and 15 from the cutoff means 220 to the toroid forming means 270. In the preferred embodiment, each strip receiving and carrier means 250 includes a sheave 251, which as best seen in FIGS. 4, 13, and 14, has four sets of radially equally spaced L-arms 252 each. The arms 252 extend radially from the sheaves 251 to receive thereon individual strips 14 and 15. The sheaves 251 are mounted on a shaft 253 which extends between the first side plates 39. On the far end of the shaft 253 is a sprocket 254 with a chain 255 therearound and around sprocket 229 to connect the sheaves 251 to the shaft 223. The strip receiving and carrier means 250 also includes slotted blocks 256, as best seen in FIG. 14, having slots 257 through which the arms 252 pass permitting the block fingers 258 to slide the individual strips 14 and 15 carried on the arms 252 therefrom and into the toroid forming means 270.

Strip seating means 260 are provided for the purpose of seating the strips of dough 14 and 15 in the toroid forming means 270. The strip seating means 260, as best seen in FIG. 2, includes a pair of discs 261 mounted on a shaft 252 extending between the first side plates 39. The near end of shaft 262 has a sprocket 263 with a chain 264 therearound to sprocket 67 which rotates the discs 361.

Double bank toroid forming means 270 are provided to receive the two series of cutoff strips of dough 14 and 15 from the two carrier means 250 and for forming such strips into toroids 18 to be discharged at and carried away by the toroid discharge means 350. Referring particularly to FIGS. 2, 5, 6 and 9, each bank of the exemplary toroid forming means 270 includes the provision of a stationary mandrel means 290, a plurality of forming sleeve assemblies 300, means moving said sleeve assemblies past said mandrel means 310 and means 330 opening and closing the sleeve assemblies.

The support structure means 271 of the toroid forming means 270 includes the first frame sub-assembly 20. The sub-structure means 272 of the toroid forming means includes two parallel longitudinal bars 273 having a transverse cross bar 274 secured thereto midway of the ends of the bars 273. The means 275 mounting the sub-structure 272 to the supporting structure 271 includes a pair of spaced vertical yokes 276 mounted on the right hand end of the first sub-assembly on the upper lateral member 23. The yokes 276 received the right ends of the longitudinal bars 273 with a pivot rod 277 extending therethrough to pivotally mount the longitudinal bars 273 to the supporting structure means 271.

Locking means 278 is provided for selectively locking the sub-structure 272 of the bars 273 and cross bar 274 to the supporting structure 271. In the preferred embodiment, the exemplary locking means are bolts 279 at the ends of the cross bar 274 which thread into the near and far side upper longitudinal members 22.

Hold open means 280 is provided for maintaining the longitudinal bars 273 pivoted to the raised open cleaning position as shown in FIG. 9. The hold open means 280 includes two central arms 281 pivoted at 282 to the central upper longitudinal members 22 of the first frame sub-assembly 20 and pivoted to the cross bar 274 at 283. The two central arms 281 are pivoted together at 284 with a sleeve 285 around the arms 281 to slide over the pivot 274 and rigidly lock the arms 271 together.

Mandrel means 290 is provided as part of the toroid forming means 270 for providing uniformity to the center opening of the completed toroid 18. Each mandrel means 290 of the toroid forming means 260 has a tapered nose 291 from which a vertical flange 292 extends upwardly and is joined to a hollow open ended block 293 in which is received the left end of one of the longitudinal bars 273. The hollow block 293 is provided with bolts 294 which engage the left end of the respective longitudinal bar 273 to selectively hold the mandrel means 290 thereto. To the right of the tapered nose is a body 295 of a diameter equal to the internal diameter of the toroid 18 which terminates in a tapered rear 296 of gradually decreasing diameter.

The sleeve assembly means 300 of the toroid forming means 290 as best seen in FIG. 15 includes a plurality of longitudinally aligned channel bodies 301. Each channel body 301 has a base 302 and a pair of opposed sidewalls 303 pivoted thereto by pivot pins 304. Together the base 302 and sidewalls 303 in the closed position form a cylinder with an inside diameter equal to the outside diameter of the toroid 18. Additionally, each sidewall 203 has wings 305 extending radially upwardly therefrom in the closed position. The wings 305 of opposite sidewalls 303 come together in the closed position for a purpose which will appear later.

As best seen in FIG. 2, the means 310 moving said sleeve assemblies 300 includes a motor 311 mounted on the lower longitudinal and lateral members 22 and 23 of the first frame sub-assembly 20. The motor has a shaft 312 extending from the near end thereof with a sprocket 313 thereon. A chain 314 extends from sprocket 313 to around sprocket 315 on shaft 316 extending between bearing blocks 317 mounted on the right vertical leg members 24 of the first frame sub-assembly 20. The shaft 316 has a small sprocket 318 on the far side thereof and a pair of spaced sprockets 319 of larger diameter. Each of the spaced pair of sprockets 319 has a chain 320 extending to a similar sprocket of a spaced pair of sprockets 321 mounted on shaft 62. As seen in FIG. 15, many of the links on chain 320 have pairs of angles 322 pivoted thereto with the upper flanges of the angles 322 being secured to the bottoms of the bases 302 to mount the channel bodies 301 along the chains 320.

The motor 311 rotates the shafts 316 and 62 via the chain 314 to move the chains 320 and the channel bodies 301 carried thereby, past the mandrel means 290 toward the right. The rotation of the motor 30 via the various chains, sprockets and meshing gears drives the carrier means 250 and the cutoff means 220 as well as the dough batch guiding means 170, divergent dough transfer means 140, dough batch forming means 80 and dough batch feeding means 70 when the frame sub-assemblies 20 and 30 are operatively joined. The means 170, 140, 80 and 70, are driven intermittently and synchronously due to the provision of the arms 228, the arm 183, the collar 182 and the one-way ratchet 181 as has been previously explained.

The toroid forming means 270 is provided with means 330 opening and closing the sidewalls 303 of the channel body 301 about the mandrel means 290 to form the strips 14 and 15 of dough into completed toroids 18. In the preferred embodiment, the means 330 includes side limit rails 331 on either side of each chain 320 and generally following the shape of the chain 320. The rails 331 are engaged by the wings 305 on the opposite sidewalls 303 to limit the pivoting of the sidewalls 303 when the channel bodies 301 are open.

The means 330 also includes opening guide means 332 which, as seen in FIG. 2, including L-shaped mounting arms 333 mounting opening guides 334. The opening guides 334 are engaged by the wings 305 of the sidewalls 303 to pivot them to the open position as they pass around sprocket 322 and toward the carrier means 250.

Closing guide means 335 is provided for closing the sidewalls 303 of the channel body 301 about the mandrel means 290. The closing guide means 335 as best seen in FIG. 5 include side blocks 336 mounted to the rails 331 alongside the chains 320 at the discs 261 of the strip seating means 260. The side blocks 336 have sidewalls 337 facing each other with the spacing therebetween decreasing to the right. The closing guide means 335 also includes yokes 338 adjacent the left ends of the longitudinal bars 273 behind the hollow block 293. The yokes 338 have extending to the left therefrom flop limiting fingers 339. The sidewalls 337 engage the wings 305 to guide them toward each other and close sidewalls 303.

The flop limiting fingers 339 may be engaged by the rings 305 to prevent the wings 305 and the sidewalls 303 from closing prematurely.

A closed guide 340 is provided after the closing guide means 335 for maintaining the wings 305 together, and therefore the sidewalls 303 closed. In the preferred embodiment, the closed guide includes parallel bars 341 defining two channels 342 each for receiving and holding the wings 305 in the closed position. The parallel bars 342 are mounted to the longitudinal bars 273 by cross bars 343.

The means 330 opening and closing the channel bodies 301 opens the sidewalls 303 thereof for receiving strips of dough 14 and 15 from the carrier means 250. The strips of dough 14 and 15 are placed on respective bases 302 and respective discs 261 of the strip seating means 260 press the strips of dough 14 and 15 into their respective bases 302 as the channel bodies 301 pass thereby to form the strip of dough 14 and 15 into U-shaped strips 16. After the channel bodies 301 pass the discs 261, they pass under the respective noses 291 of the mandrel means 290 as the sidewalls 293 are cammed to pivot relative the bases 302 around the mandrel means 290 to a closed position around the mandrel bodies 295, first forming U-shaped strips 16 into partially roller toroids 17 and then into completed toroids 18 as the closed channel body 301 passes along the body 295 of the mandrel means 290. As the channel body 301 passes the tapered rear 296 of the mandrel means 290 and the wings 305 pass from the channels 342, the sidewalls 293 open and pass around sprocket 315 while the completed toroids 18 are delivered to the toroid discharge means 340.

When the apparatus 10 is not being operated and the first frame sub-assembly 20 has been separated from the second frame sub-assembly 30, the sub-structure means 272 may be separated from the supporting structure means 271 by releasing the locking bolts 279 on the ends of the cross bar 274 and raising the longitudinal bars 273. The raising of the bars 273 first slides the wings 305 from the channels 343 defined by closed guide means 340 permitting the sidewalls 303 to open, and then raises the mandrel means 290 from the opened channel bodies 301 until as shown in FIG. 9 the bars 273 reach the opened cleaning position. The hold means 278 can be utilized to maintain the sub-structure means 272 in the open cleaning position to provide access for cleaning to the mandrel means 290 and the open channel bodies 301. If so desired, the mandrel means 280 may be removed by loosening bolts 294 and sliding the hollow blocks 293 off of the end of the bars 273, either for cleaning or for replacing by another mandrel means 290.

To close the sub-structure means 272, the hold open means 278 is released, the longitudinal bars 273 are lowered, and the locking bolts 279 inserted. Upon closing, the longitudinal bars 273, the mandrel means 290, the closing guide means 355 and the closed guide menas 340 are all located over the open channel bodies 301 and will close the next bodies 301 as they move thereby on the chains 340.

The toroid discharge means 350 of the apparatus 10 for receiving the completed toroids 18 from the toroid forming means 270. In the preferred embodiment, the toroid discharge means 350 includes a guide rod 351 for each mandrel means 290 with an aperture 352 being provided in the tapered rear 296 and a bayonet lock 353 extending from the tapered rear 296 for mounting the guide rod 351 thereto. The guide rod 351 extends from the tapered rear 296 of the mandrel means 290 outwardly and downwardly to guide the movement of each completed toroid 18.

The toroid discharge means 350 also includes a conveyor belt 355 for receiving the completed toroids 18 and transporting them for further processing. The conveyor belt 355 runs over a sheave 356 on shaft 357 extending between sidewalls 358 (the other sheave and shaft are not shown). As seen in FIGS. 2 and 5, each sidewall 358 has a pin 359, therein around which is received one end of a brace wire 360 from an eyelet 361 mounted to the right end corner post members 24 of the first frame sub-assembly 20. A sprocket 362 is mounted on the near end of shaft 357. The right corner post members 21 of the first frame sub-assembly 20 have aligned bearing blocks 363 mounted thereon with a shaft 364 extending therebetween. The near end of shaft 364 has a sprocket 365 around which a chain 366 extends to sprocket 318 and a sprocket 367 next to the sprocket 365 with a chain 368 to sprocket 362 to drive the conveyor belt 355. The whole conveyor assembly is pivotable on shaft 364 to accommodate different discharge heights and is pivotal to a vertical position for storage.

The guide rod 351 from the mandrel means 290 receives a completed toroid 18 therearound. The completed toroid 18 slides down the guide rod 351 and off the lower end thereof which is spaced above the upper surface of the conveyor belt 355. When the completed toroid 18 lands on the surface of the conveyor belt 355, it is carried by the conveyor belt 355 to the right for further processing.

Thus, from the foregoing detailed description of the toroid forming apparatus 10 for converting a batch of dough into a plurality of individual toroids 18, the improvements provided in the apparatus 10 achieves the various aforementioned objects. The apparatus 10 is provided with first and second frame sub-assemblies 20 and 30 which separate to facilitate cleaning and a series of supporting structure means and sub-structure means which are movable to an open cleaning position to provide access to the internal parts of the apparatus 10 for cleaning.

Additionally, the apparatus 10 is provided with a divider means 135 for dividing the wide ribbon of dough 11 into a plurality of narrow ribbons 12 and 13, each of which is individually processed by the apparatus 10 to form a series of completed toroids 18 by providing parallel banks of dough batch guiding means, cutoff means, toroid forming means to deliver twice as many completed toroids 17 to the toroid discharge means 340 from a single dough batch feeding and forming means than would a single banked toroid forming apparatus.

I claim:

1. In an apparatus for converting a batch of dough into a plurality of individual toroids wherein the apparatus includes dough batch feeding, forming, guiding, and cutoff means for delivering dough parts to a toroid forming means provided therewith, said toroid forming means including mandrel means, a plurality of forming sleeve assembly means, means for moving said forming sleeve assembly means along the mandrel means, and means for opening and closing said forming sleeve assembly means as they move along the mandrel means to form the toroids, the improvement in a frame assembly mounting said means to facilitate the cleaning thereof comprising:

a first frame sub-assembly means for mounting said toroid forming means;

a second frame sub-assembly means for mounting said dough batch feeding, forming, guiding and cutoff means; and guide means on said sub-assemblies for guiding said first and second sub-assemblies between an operative joined position wherein said dough batch feeding, forming, guiding and cutoff means are positioned to deliver dough parts to said toroid forming means, and a separated position wherein said sub-assemblies and associated means are displaced away from each other to facilitate the cleaning thereof;

said first frame sub-assembly means for mounting said toroid forming means including:

supporting structure means for mounting the plurality of forming sleeve assembly means, the moving means, and the opening and closing means;

substructure means for mounting the mandrel means; and means movably mounting the substructure means to the supporting structure means for movement between a closed operable position wherein the forming sleeve assembly means move along the mandrel means and an open cleaning position wherein said mandrel means is spaced from said forming sleeve assembly means, opening of said forming sleeve assembly means from around the mandrel means and moving the substructure to the open cleaning position separating the mandrel means from the forming sleeve assembly means for cleaning the mandrel means and the forming sleeve assembly means; wherein the substructure means is pivoted to the supporting structure means to pivot between the two positions, and hold open means is provided for maintaining of the substructure means in the open cleaning position.

2. In an apparatus for converting a batch of dough into a plurality of individual toroids wherein the apparatus includes dough batch feeding, forming, guiding, and cutoff means for delivering dough parts to a toroid forming means provided therewith, said cutoff means including a cutoff blade and cam means selectively engaging the cutoff blade for cutting strips of dough from a ribbon of dough, the improvement in a frame assembly mounting said means to facilitate the cleaning thereof comprising:

a first frame sub-assembly means for mounting said toroid forming means;

a second frame sub-assembly means for mounting said dough batch feeding, forming, guiding and cutoff means; and guide means on said sub-assemblies for guiding said first and second sub-assemblies between an operative joined position wherein said dough batch feeding, forming, guiding and cutoff means are positioned to deliver dough parts to said toroid forming means, and a separated position wherein said sub-assemblies and associated means are displaced away from each other to facilitate the cleaning thereof;

said frame sub-assembly mounting said cutoff means comprising:

a supporting structure rotatably mounting the cam means, a substructure movably mounting the cutoff blade for movement into and away from the ribbon of dough in response to engagement thereof by the cam means to cut the strips of dough therefrom, and means movably mounting the substructure to the supporting structure for movement between a closed operable position and an open cleaning position separating the cutoff blade from the cam means to provide access to the cutoff blade.

3. The improvement as in claim 2 wherein means are provided for pivotally mounting the cutoff blade to the structure, and means are provided for pivotally mounting the substructure to the supporting structure to permit the blade to be pivoted away from the substructure when the substructure is pivoted relative to the supporting structure to the open cleaning position.

* * * * *